Sept. 3, 1957 F. L. HERMACH 2,805,394
ALTERNATING-CURRENT VOLT-AMMETERS
Filed Nov. 7, 1952

INVENTOR
FRANCIS L. HERMACH

BY Howard L. Rose

AGENT

United States Patent Office 2,805,394
Patented Sept. 3, 1957

2,805,394

ALTERNATING-CURRENT VOLT-AMMETERS

Francis L. Hermach, Silver Spring, Md., assignor to the United States of America as represented by the Secretary of Commerce Application November 7, 1952, Serial No. 319,439

5 Claims. (Cl. 324—106)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, 1883, as amended (45 stat. 467; 35 U. S. C. 45).

The present invention relates to an A.-C. volt-ammeter and in particular to a portable alternating-current ammeter and voltmeter which will give accurate results over very wide frequency ranges.

The increasing use of electric energy for aircraft, induction furnaces, and induction heating, and the greater accuracy required in measurements in electronics have led to increasing demands for accurate ammeters and voltmeters for use at frequencies extending upward from power frequencies through the entire audio-frequency range.

There are several methods for accurately measuring alternating currents and voltages. Perhaps the most common is the accurate electro-dynamic alternating-current meter. This type of meter is usually expensive and has a limited frequency range. Another instrument in common use is the thermocouple instrument. A limitation of this meter is that the temperature characteristics and calibration stability are poor over long periods of time, and the instrument should be calibrated with an accurately known standard immediately prior to use.

One object of the present invention is to provide an A.-C. volt-ammeter that is accurate over a very wide frequency range.

Another object of the present invention is to provide a thermocouple type of alternating-current volt-ammeter in which the long-time stability characteristics of the thermoelement are unimportant.

Another object of the present invention is to provide an alternating-current volt-ammeter having a very high degree of accuracy.

Another object of the present invention is to provide an alternating-current volt-ammeter which is portable and may be quickly and accurately used by a relatively inexperienced operator.

Other uses and advantages of the invention will become apparent upon reference to the specification and drawings.

Figure 1:
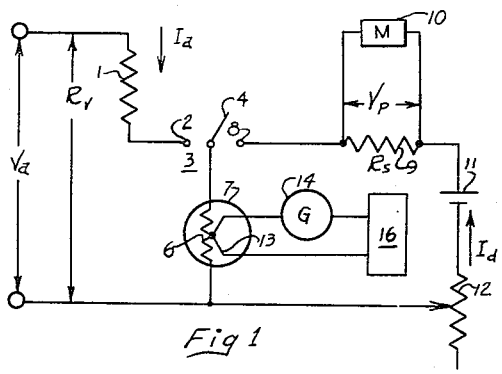
Figure 1 is a circuit diagram of a voltmeter according to the present invention.

In Figure 1, which is a wiring diagram of a voltmeter according to the present invention, there is provided a resistor 1 having one terminal connected to one side of a source of alternating voltage and the other terminal connected to a contact 2 of a switch 3. The throw 4 of the switch 3 is connected to the heater 6 of a thermoelement 7. The other end of the heater 6 is connected to the other terminal of the alternating voltage source. The second contact 8 of the switch 3 is connected to the resistor 9 and the other end of the resistor 9 is connected to the battery 11. The other terminal of the battery 11 is connected to the variable resistor 12, the other end of which is connected to the lower terminal of the alternating-voltage source and the end of the heater 6 of the thermoelement 7. The thermocouple 13 of the thermoelement 7 is connected through the galvanometer 14 to a variable source of voltage 16 and the other terminal of the variable source of voltage is connected to the other terminal of the thermocouple 13. $V_a$ is the alternating voltage to be measured by the instrument. $R_v$ is the combined resistance of the resistor 1 and heater 6. When it is desired to measure the alternating voltage, the switch throw 4 is thrown to contact the terminal 2 of switch 3, the current $I_a$ flowing through the element 6 causing the thermocouple 13 to produce a voltage which is a measure of the current flowing through the heater 6. The variable source 16 is varied to buck out the current flowing from the thermocouple and this is detected by the fact that the galvanometer deflection is zero. After the throw 4 is made to contact the terminal 8, the resistor 12 is varied until the galvanometer 14 again reads zero, indicating thereby that the current through the heater element 6 is the same as when the switch was thrown to the left. The voltage $V_p$ across the resistor 9 is then measured with a D.-C. voltage-measuring device 10, which may be a voltmeter or a potentiometer, and, since the resistance is accurately known, the current $I_d$ in the direct-current circuit may be determined. The alternating voltage $V_a$ is equal to the current through the heater $I_a$ times $R_v$, the total resistance in series with the source. Since $I_d$ is equal to the current through the heater $I_a$, $I_a$ is equal to the voltage across the resistor 9 divided by the resistance $R_s$ of the resistor 9. Therefore $$V_a = \frac{V_p R_v}{R_s}$$

As can be seen from the above equation, the accuracy of the instrument depends only upon a ratio of resistances and the voltage $V_p$, all of which can be accurately determined. The main source of error perhaps would lie in the characteristics of the thermoelement 7 in response to frequency. However, since the thermoelements have a flat frequency response over several thousand kilocycles, the resistance element 1 would ordinarily be more frequency responsive than the heater 6 of the thermoelement 7, and the latter would not present a limitation to the range of frequencies. (For a discussion of thermoelements, see NBS Journal of Research, vol. 48, No. 2, p. 121, February 1952.)

The extreme accuracy of this instrument has been attained by basing the voltage determination on the formula $V=IR$, since both current and resistance can be determined within very narrow limits; the current because of the manner in which it is measured and the resistance because of the availability of resistors of high accuracy. The combination of the balancing voltage source 16 and the galvanometer 14 makes it possible to determine very accurately when the outputs of the thermocouple 13 due to alternating current and to direct current are of the same magnitude. As a result of these factors and the fact that the output of thermocouple 13 is not appreciably affected by frequency, it is possible to detect when the alternating and direct currents through the heater element 6 are equal.

In this voltmeter the long-time stability of the thermoelement is unimportant, since it is only essential that it remain stable for the short time necessary to make an individual measurement.

The instrument can be used quickly, as the only adjustments necessary are adjustment of the variable source 16 to produce zero deflection of the galvanometer 14 and adjustment of the resistor 12 to produce the same deflection of the galvanometer 14, that is, zero deflection. Another adjustment may be necessary if very accurate measurements are to be made, since for the highest accuracy it is preferable to use a potentiometer as D.-C. voltage-measuring device 10.

Figure 2:
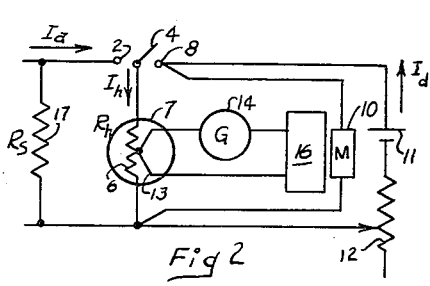
Figure 2 is a circuit diagram of an ammeter similar in principle to the voltmeter shown in Figure 1.

Figure 2 shows an ammeter circuit which has adopted the principles of operation shown in Figure 1. In this circuit the resistor 17 across the input alternating current $I_a$ is shunted by the heater 6 when the switch 3 is thrown to the left. The reading is made in the same manner as in Figure 1, and the switch is then thrown to the right, the same procedure being followed as with respect to Figure 1, except that there is no resistor 9. Instead the voltage $V_p$ is measured directly across the heater resistor 6 by meter 10. From the circuitry of the device the current $$I_a = \frac{V_a(R_s+R_h)}{R_s R_h}$$

Since $V_p = V_a$, where $V_a$ is the voltage of the input source, $$I_a = \frac{V_p(R_s+R_h)}{R_s \cdot R_h}$$

Figure 3:
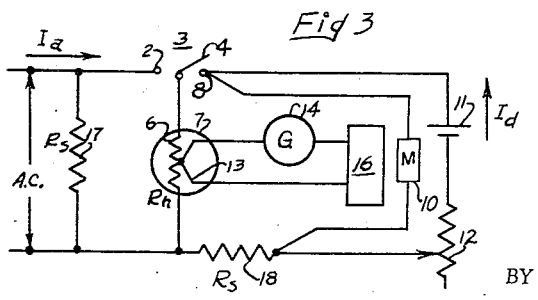
Figure 3 is a circuit diagram of a preferred form of ammeter according to the present invention.

The measured current depends upon the resistance of the heater of the thermoelement as well as that of the shunt. This is undesirable for precise measurements as the heater resistance is not wholly independent of the current or the ambient temperature because of the small temperature coefficients of resistance of the heater alloys. In addition, temporary overloads may permanently change this resistance, and also $R_s$ would have to be adjusted to odd values. Figure 3 shows how this difficulty may be overcome by the inclusion in the direct-current circuit of a resistor 18 which is identical in value with the resistor 17 in the alternating-current circuit.

Figure 3 is a circuit diagram of a preferred ammeter according to the present invention. The resistor 17, having resistance $R_s$, is shunted across the terminals of an alternating-current source. A resistor 18 having a resistance value $R_s'$ equal to resistance $R_s$ is inserted between the resistor 12 and the junction of the lower terminal of heater 6 and the lower input terminal. The voltage $V_p$ is measured across heater 6 and resistor 18 in series by meter 10. The operation is very much the same as in Figure 2. Initially the switch is thrown to the left and the battery is varied until the galvanometer deflection is zero. The switch is then thrown to the right and the resistor 12 is varied until the galvanometer deflection is again zero. The voltage across the heater 6 and resistor 18 is then determined by a potentiometer or meter. The current supplied to the input terminals is expressed by the equation, $$I_a = \frac{V_a}{R_s R_h/(R_s+R_h)} = \frac{I_h R_h}{R_s R_h/(R_s+R_h)}$$

since $V_a = I_h R_h$, where $I_h$ is the current through the heater. However, $I_h = I_d$, which is equal to $$\frac{V_p}{R_h + R_s}$$

since $R_s' = R_s$. Substituting this in the original equation $$I_a = \frac{V_p}{R_s}$$

This instrument has the same characteristics as the voltmeter in Figure 1 and therefore has the same inherent advantages. However, in this case the measurement and the calculation of the current is a little simpler in that there are only two terms instead of three. This method has an advantage over the voltmeter method in that the resistance of the heater may be eliminated, although the heater resistance will remain fairly stable during the voltage measurements described in Figure 1.

Figure 4:
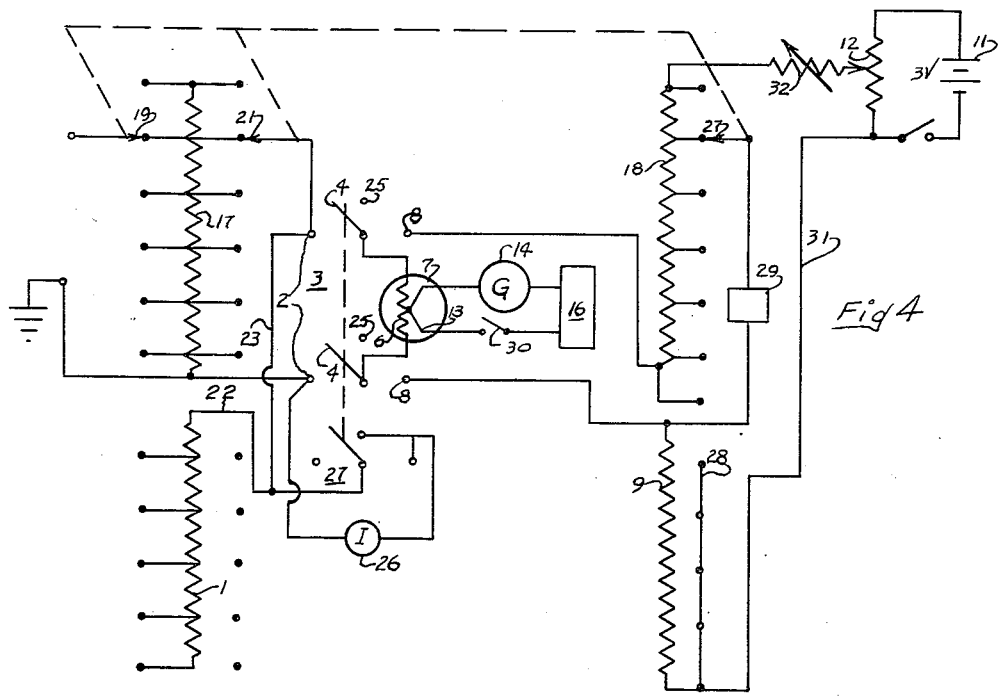
Figure 4 is a circuit diagram of an overall instrument incorporating the features of both the ammeter and voltmeter.

Figure 4 is a wiring diagram of an A.-C. volt-ammeter according to the present invention. When the instrument is operated as a voltmeter the slider 19 is positioned along one of the contacts of resistor 1. The various contacts are used so that numerous voltage ranges may be measured on the instrument. The various ranges are taken care of by cutting in or out different values of resistor 1. The slider 21, which is mechanically constrained to operate in unison with the slider 19, engages unconnected contacts during the voltage measurements so that it is not effectively in the circuit. During the voltage measurement the voltages impressed across one of the contacts of the resistor 1 are carried over the leads 22 and 23 to the upper left contact of the switch 3. The other input of the alternating voltage is applied to the ground terminal of the instrument which is connected over line 24 to the lower left contact of the switch 3. With the switch thrown to the left the current flows through the resistor 1 and the heater 6 and then to the other terminal of the input, thereby making a series circuit as shown in Figure 1. With the switch 3 thrown to the middle position (that is, contacting the dead terminals 25) the instrument 26 is cut into the circuit by switch 27 which is mechanically tied to the switch 3. In practice switch 3 would be first thrown into the center position with the instrument 26 in the circuit so that the operator could obtain an approximate indication of what voltages will appear across the heater 6 and the resistor 9. This has a twofold purpose. As is generally realized, a thermoelement is particularly sensitive to overloads. With the switch 3 initially in the center position, the instrument 26 will receive the load from the source, thereby giving an approximate value of the voltage. Knowing this approximate value the operator can adjust the slider 19 so that the heater 6 will not be overloaded. Since the meter 26 is a rectifier instrument it can more readily take overloads and therefore is suitable for this purpose. Also the initial reading on the instrument 26 gives an approximation of the voltage which will be read across resistor 9 and therefore the potentiometer which will be used to measure the voltage across this resistor can be set to a value approximating the final reading.

With the switch 3 in the far right position the direct-current measurements can now be made. It should be noted that the slider 27 is also physically constrained to travel with the slider 19 and therefore during voltage measurements will be positioned so as to contact one of the string of contacts 28, any one of which will bring into the circuit the entire resistance of the resistor 9. A potentiometer or meter 29, which may or may not be incorporated into the instrument, is connected between the slider 27 and the top of resistor 9. The current in the direct-current circuit when the voltmeter is being used flows through the resistor 12, lead 31, resistor 9, and through the switch 3, heater 6, resistor 18, resistor 32, which is merely another variable resistor giving finer control of the current, and thence to the resistor 12.

When it is desired to make current measurements, the slider 19 and therefore slider 21 are made to contact one of the contacts of resistor 17 depending upon the current range that will be measured by the instrument. With this arrangement the current flows through resistor 17, and since slider 21 is constrained to travel with slider 19 through the heater 6 in parallel with the resistor 17, the meter 26 serves the same purpose in this circuit as it did when the voltmeter was being used. The slider 27, which is positioned along with the sliders 19 and 21, varies the magnitude of the resistor 18 so that its value is always the same as that of resistor 17. With the slider 27 positioned along resistor 18, the resistor 9 is not in the direct-current circuit, but other than this the operation of this circuit is the same as when used with the voltmeter.

It will be apparent that the embodiments shown are exemplary and that various modifications can be made in construction and arrangement within the scope of my invention as defined in the appended claims.

I claim:

1. An A.-C. volt-ammeter comprising a first circuit connected to receive an A.-C. quantity of an unknown magnitude, a second circuit comprising a variable source of direct current, first means for producing a voltage in response to current flow through said first means, switching means for connecting said first means in series with said first circuit and in series with said second circuit individually, second means connected across said first means for bucking out the voltage produced by said first means, and third means for determining the current flow through said second circuit.

2. An A.-C. volt-ammeter comprising a first circuit connected to receive an A.-C. quantity of an unknown magnitude, a second circuit comprising a variable source of direct current, first means for producing a voltage in response to current flow through said first means, switching means for connecting said first means in series with said first circuit and in series with said second circuit individually, second means connected across said first means for bucking out the voltage produced by said first means, measuring means for determining when the voltage produced by said first means is bucked out by said second means, and third means for determining the current flow through said second circuit.

3. An A.-C. volt-ammeter, comprising a first circuit connected to receive an A.-C. quantity of an unknown magnitude, a second circuit comprising a variable source of direct current and a resistor connected in series, a thermoelement comprising a heater and a thermocouple, switching means for connecting said heater in series with said first circuit and in series with said second circuit individually, said thermocouple connected directly across a measuring means and a second variable source of direct current connected in series, and current measuring means including said resistor for determining the current in said second circuit.

4. The invention according to claim 3 in which a second resistor is connected in said first circuit so as to be in parallel with said heater when said heater is connected to said first circuit.

5. The invention according to claim 3 in which a second resistor is connected in said first circuit so as to be in series with said heater when said heater is connected to said first circuit.

References Cited in the file of this patent
UNITED STATES PATENTS

| | | |
|---|---|---|
| 2,314,764 | Brown | Mar. 23, 1943 |
| 2,399,481 | George | Apr. 30, 1946 |
| 2,577,543 | Saad | Dec. 4, 1951 |